Patented Nov. 26, 1935

2,022,579

UNITED STATES PATENT OFFICE 2,022,579

2,3-HYDROXY-NAPHTHOIC ACID ARYLAMIDE

Joseph Felix Turski, Warsaw, Poland

No Drawing. Application February 8, 1930, Serial No. 427,068. In Poland February 14, 1929

1 Claim. (Cl. 260—124)

This invention relates to the manufacture of new dyestuff intermediates capable of diazotization and self coupling; and it comprises reacting an amino-nitro, amino-hydroxy or diamino aromatic body with carboxylic acids of aromatic compounds containing hydroxy or amino groups and treating the condensation product to form the dyestuff intermediates of the anilide type which also contain a free amino group; it further comprises converting such intermediates into azo dyestuffs by diazotization and self-coupling; and it also comprises dyeing animal, vegetable or artificial fibers by means of such dyestuffs; all as more fully hereinafter set forth and as claimed.

The anilides of beta-hydroxynaphthoic acids are known to be dyestuff intermediates but they are used as end or coupling components, being coupled with diazo compounds. Also bi-acetyl-acetotolidid and acetylated aminosulphonic acids have similarly been used as end or coupling components. Such compounds are developed or converted into dyestuffs by treating them with mixtures of nitrosoamines and stabilized diazo compounds. Diazotized aromatic amines, such as aminonaphthol sulphonic acids, are used.

Anilides which contain nitro, methoxy and like groups have likewise been used as coupling components. In all compounds of this type heretofore used as end or coupling components, there is no free amino group present; they cannot be diazotized and used as first components in a manner similar to the aminonaphthol sulphonic acids containing a free amino group, as set forth ante.

I have discovered a new type of intermediate which can be diazotized and used as a first component. These new intermediates are of the same general type as those mentioned above but differ in that they contain a free amino group. The presence of this free amino group renders them susceptible of many new and useful applications of which the prior intermediates are incapable. From my new intermediates I have produced new and useful azo dyestuffs. My new intermediates may be used either as first components or as end or coupling components, or both. This double function of my new intermediates is advantageous and valuable.

Dyestuffs may be directly produced by simply diazotizing the intermediates and permitting self-coupling to occur. By such a process fabric may be dyed in a simple manner, the dyestuff being formed in situ. The fabric is impregnated with the intermediate and then treated with a diazotizing solution. The intermediate in the fiber is diazotized and self-coupled within the fabric to produce the dye; dyeing the fabric.

This is but one of the new and advantageous ways in which my novel dyestuffs may be applied. The dyestuff may be prepared from solution in the form of an insoluble powder. These insoluble powders may be used as pigments; for instance they may be used in preparing colored lacquers. When the azo dyes are to be used as pigments, it may be desirable to deposit the insoluble dyestuff on a suitable substratum. In the composite azo dye-pigment thus produced, the azo dye is "extended" so that its coloring power is utilized to the greatest advantage.

The new intermediates may be represented by the following general formula

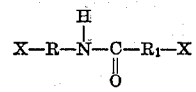

wherein R represents an aryl residue, $R_1$ represents an aryl residue or the residue of the enol form of a ketocarboxylic acid and X represents an OH or $NH_2$ group, and in which there is present at least one free amino group.

Under the generic class given above there are certain sub-classes which are of special value. They may be represented by the following formulæ.

I. 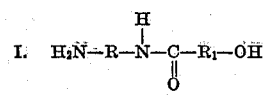

II. 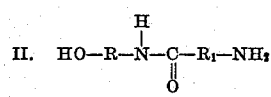

III. 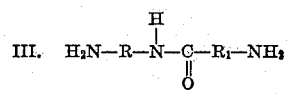

In the above formulæ, R and $R_1$ are of the same significance as in the generic formula.

I prepare these intermediates in several ways; which may be divided into two general classes. One general method comprises condensing together a carboxylic acid which contains a hydroxy or a nitro group, with a monoamino compound containing hydroxy or nitro group and then treating the condensation product to reduce the nitro group or groups to form a free amino group. The reduction may be effected in various ways. It may be carried out in an alkaline medium, by sulphide, for instance sodium sulphide or by a solution of stannous oxide in caustic soda. Reduction may be also carried out in a slightly acidified medium by means of hydrogen or by means of the lower metal chlorides, as SnCl₂, FeCl₂ and the like.

This method is essentially a reduction process, in which nitro compounds of the types

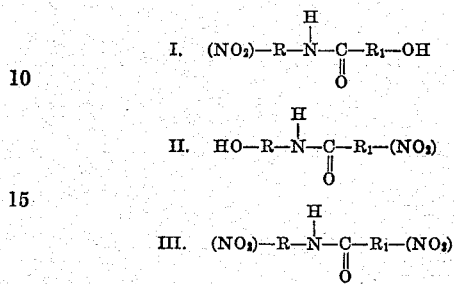

are converted into the corresponding amino compounds.

The other general method comprises condensing equimolecular proportions of a suitable diamine and of the chloride of a suitable hydroxy-carboxylic acid. Such a process may be effected by mixing one mole of diamine with one mole of hydroxy-carboxylic acid. (This mixture may be in the form of a suspension in a solvent, for instance, in toluene, solvent naphtha, melted naphthalene or pyridine.) The mixture is heated and phosphorous trichloride (PCl₃) is added. The anilide containing a free amino group is then isolated in a suitable manner. These anilides may be represented by the general formula

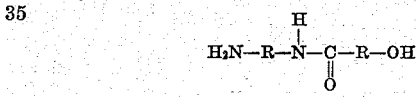

In the above reaction in place of the diamine there may be used a diamine having one amino group substituted, for instance by para-toluene sulphonic chloride. After the condensation the said substituent group may be removed by saponification.

By this second general process using solvent naphtha or chlorbenzene as the solvent, tolidine may be acetylated by means of acetyloacetic ester forming a compound having the probable formula

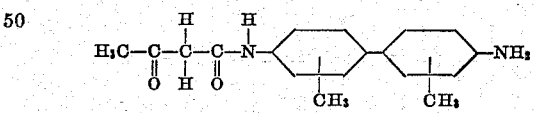

This compound may also be obtained by substituting a monoacetylated amino tolidine for the tolidine and after condensation submitting the acetylated acetyloacetodiamine to a careful partial saponification to form the above compound.

It is to be readily understood that my general methods of preparing the new intermediates may be widely varied to produce a given intermediate in the most advantageous manner. I hereinafter give specific examples illustrating the preparation of some of the particular intermediates.

My new intermediates are easily and readily converted into azo dyestuffs. They may be diazotized and coupled in any suitable manner. The intermediate may be dissolved in caustic soda and the solution thus obtained poured into a solution of nitrite acidified with acetic acid. The acidity of the mixed solutions is so adjusted that diazotization and self-coupling is effected. The resulting azo dyestuff may be recovered in any suitable manner. By this procedure part of the intermediate is diazotized and coupled with the remaining portion of the intermediate. This is what is termed self-coupling, the intermediate serving as both first and coupling components. It is within the scope of the present invention to diazotize one of my new intermediate compounds and then couple it with a second and different intermediate of the type herein disclosed. In this case however it is necessary to take precautions to prevent self-coupling. Likewise any other type of coupling component may be used if desired.

My new intermediates can be also used as end or coupling components only. They may be used in a manner analogous to the acylated aminonaphthyl sulphonic acids hereinbefore mentioned and coupled to any diazo compound. In this case however the presence of the free amino group in the intermediate may be troublesome. But by exercising due care coupling may be effected and new azo dyestuffs produced. For instance tetrazotized dianisidine may be coupled with my new intermediates when reasonable care is exercised. The azo dyes thus produced are permanent bluish-black dyes which may be used as pigments.

However my most valuable dyestuffs are those produced by self-coupling. This self-coupling is of special value in producing dyed fabrics in which the dyestuff is produced in situ. In producing such dyed fabrics the fabric is impregnated or saturated with an alkaline solution of the intermediate. The impregnated fabric is then treated with a solution of nitrite acidified with acetic acid. The dyestuff is developed by diazotizing and self-coupling of the single intermediate, being produced in situ.

In my process of diazotization, the intermediate may be put into solution in an acid medium instead of an alkaline medium, by forming the hydrochloride of the amino anilide. The diazotizing solution may be a nitrite solution acidified with mineral acid instead of acetic acid. In this case the excess of mineral acid is neutralized by means of sodium acetate so that the diazotizing solution has substantially neutral reaction to Congo-red test paper. I find that when the diazotizing solution has such a degree of neutrality it is advantageous for the present purposes.

Dyestuffs may be prepared by my present method by diazotization and self-coupling from amino anilides of salicylic acid, 2, 3-hydroxy-naphthoic acid, pyrazolone carboxylic acid, acetoacetic acid and similar acids. The dyestuff from the meta-amino anilide of 2, 3-beta-hydroxy-naphthoic acid is a reddish pigment. That from the meta-amino-toluides of the same acid is rose color. Those from the para-amino anilides, meta-amino anisidid and para-amino anisidid of the same acid are respectively purple, reddish purple and violet pigments.

The dyes from monosalicylid of benzidine are yellowish dyes. Dyestuffs of similar color are obtained from the meta-amino anilide and para-amino anilide of salicylic acid; and also from mono-acetyloacetotolidine. When the di-anisidid of mono-hydroxynaphthoic acid is diazotized there is formed a permanent brown diazo compound which is coupled only after special treatment giving a bluish heliotrope color. The hydroxyanilide of amino or hydroxy-carboxylic acids form dyestuffs in a manner similar to the aminoanilides of the hydroxy-carboxylic acids. The dyestuff derived from 1-hydroxy-8-naphthylamid of meta-aminobenzoic acid, said amid having the following formula

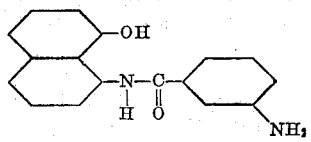

gives a purple color.

The amino anilides of the amino-carboxylic acids yield dyestuffs by diazotization and self-coupling. For instance a fabric may be saturated with the hydrochlorid of meta-amino anilide of meta-aminobenzoic acid and the dyestuff produced in situ by treating with a diazotizing solution.

The diazotization may be effected by a nitrite solution acidified with a mineral acid for instance hydrochloric acid and the excess of acid neutralized with sodium acetate to produce a neutral reaction to Congo-red test paper.

When such a diazotizing solution is used with the amino anilides of hydroxy-carboxylic acids and the hydroxy anilides of amino-carboxylic acids the formation of the dyestuff is considerably slower than when used with the aminoanilides of amino-carboxylic acids.

My new dyestuffs are characterized by a purity of color and durability to washing, light and chlorine. The dyed fabrics likewise have such fastness characteristics. My new dyestuffs have a chemical affinity for a fiber. The intermediates themselves also have chemical affinity for vegetable, animal and artificial fibers such as acetate silk or celanese silk.

The following examples further illustrate my invention.

*Example 1*

1 mol of meta-nitroanilide of 2,3-hydroxynaphthoic acid is suspended in one liter of water and heated to 60–65° C. Afterwards there is added with agitation 390 grams of a 61 per cent solution of sodium sulphide. The amino anilide passes into solution and after termination of the reduction, the solution is filtered from impurities. From the filtrate the aminoanilide is precipitated by means of acid. Mineral or acetic acid may be used; such acid being added until the solution is neutral to litmus. The aminoanilide is recovered, washed and dried.

In place of the meta-nitroanilide of 2,3-hydroxynaphthoic acid used in the above example, there may be substituted the meta-nitrotoluidide of the same acid.

*Example 2*

1 mol of meta-phenylenediamine is carefully mixed with 1 mol of 2,3-hydroxynaphthoic acid and the mixture suspended in 600 grams of toluene. The suspension in toluene is heated to 50° C. and 12 grams of PCl₃ slowly added. Then the temperature is raised to boiling point of the toluene and the excess of hydrochloric acid boiled off. After the separation of the excess hydrochloric acid, the mixture is neutralized with sodium carbonate solution and the toluene distilled off. The solid residue is mixed with hot water and boiled to extract soluble impurities. The dyestuff is filtered from the solution and then dried and ground.

In place of the meta-phenylene diamine in the above example there may be substituted meta-toluylene diamine.

*Example 3*

1 mol of salicylic acid is condensed with 1 mol of meta-nitroaniline in a manner similar to that of Example 2. The meta-nitroanilide thus obtained is reduced by the process set forth in Example 1.

*Example 4*

1 mol of benzidine is mixed with 1 mol of salicylic acid and condensation is effected in a manner similar to that set forth in Example 2. The condensation product is dissolved in 800 c. c. of 10 per cent caustic soda solution and boiled. The excess of benzidine is separated by filtration. The benzidine-mono-salicylid is precipitated by means of acid.

*Example 5*

1 mol of 1-phenyl-5-pyrazolone-3-carboxylic acid is condensed with 1 mol of meta-nitroaniline in the manner set forth in Example 2. The nitroanilide thus produced is then reduced to the corresponding amino compound by the method of Example 1.

*Example 6*

1 mol of meta-nitrobenzoic acid is mixed with 1 mol meta-nitroaniline and condensation effected by the method of Example 2. The dinitroanilide thus produced is reduced by the process of Example 1 using a double quantity of the reducing agent; the dinitroanilide is suspended in two liters of water at 60–70° C. and either 700 grams of 61 per cent sodium sulphide solution, or an alkaline solution of stannous oxide in equivalent quantity, is added. After reduction the reaction product is acidified with sufficient sulphuric acid to give a strong acid reaction. The intermediate is recovered by filtration and dried. When used in dyeing, the said product is treated with caustic soda solution and filtered off. It is then dissolved in hydrochloric acid, the acid content of which is sufficient to give a slightly acid reaction.

*Example 7*

20 grams of meta-aminoanilide of 2,3-hydroxynaphthoic acid is dissolved in 200 c. c. of water containing 25 c. c. of a 40° Bé. caustic soda solution and heated until a clear solution is obtained. The clear solution thus obtained is diluted with cold water to one liter. This diluted solution is poured slowly with agitation into a solution of 7 grams of nitrite in a liter of water acidified by 20 c. c. of 80 per cent acetic acid. The gradually precipitated white deposit is transformed by self-coupling into a red insoluble azo dyestuff.

*Example 8*

A fabric of cotton, wool, or artificial fiber is saturated with a solution of the meta-aminoanilide prepared as in Example 7. The impregnated fabric is then treated with a dilute aqueous solution of acetic acid to neutralize or slightly acidify the same. It is then introduced to a diazotizing solution, for instance a nitrite solution prepared as in Example 7. After a few minutes the azo dyestuff is developed in situ and the fabric is dyed a splendid red shade.

*Example 9*

20 grams of the hydrochloride of meta-aminoanilide of meta-aminobenzoic acid, produced as in Example 6 are dissolved in one liter of warm water and a fabric is saturated with said solution. The saturated fabric is then treated with a diazotizing solution containing 7 grams of sodium nitrite in a liter of water, acidified by means of 20 c. c. of 80 per cent acetic acid; said solution being rendered neutral to Congo-red paper by the addition of sodium acetate. The dyestuff within a few minutes is developed in situ and the fabric is dyed a brownish yellow shade.

Certain advantageous dyestuff intermediates falling within the scope of my invention can be represented by the general formula

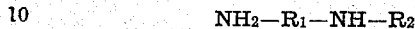

wherein $R_2$ represents the coupled residue of aceto-acetic acid ($-CO.CH_2.CO.CH_3$) or of 2-3-beta-hydroxynaphthoic acid

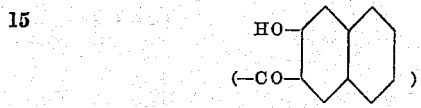

and where $R_1$ represents the group

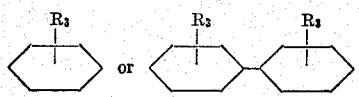

$R_3$ being hydrogen or an alkyl or alkoxy group.

I claim:

As new dyestuff intermediates, amino compounds of the anilid type having the formula,

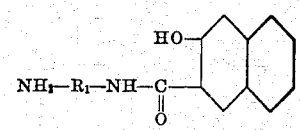

wherein $R_1$ is a group of the benzene series selected from the class having the following formula

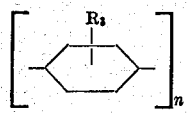

wherein $R_3$ represents hydrogen, an alkyl or alkoxy group and $n$ is 1 or 2.

JOSEPH FELIX TURSKI

CERTIFICATE OF CORRECTION.

Patent No. 2,022,579. November 26, 1935.

JOSEPH FELIX TURSKI.

It is hereby certified that error appears in the printed specification of the above numbered patent requiring correction as follows: Page 2, second column, line 55, for "3-beta-hy-" read 3-hy-; and that the said Letters Patent should be read with this correction therein that the same may conform to the record of the case in the Patent Office.

Signed and sealed this 14th day of January, A. D. 1936.

Leslie Frazer
Acting Commissioner of Patents.

(Seal)